United States Patent
Matsuda et al.

(10) Patent No.: US 8,127,740 B2
(45) Date of Patent: Mar. 6, 2012

(54) BLOWBY GAS TREATMENT SYSTEM FOR MULTIPLE CYLINDER ENGINE

(75) Inventors: Hayato Matsuda, Wako (JP); Shigeru Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/468,320

(22) Filed: May 19, 2009

(65) Prior Publication Data
US 2009/0288649 A1 Nov. 26, 2009

(30) Foreign Application Priority Data
May 21, 2008 (JP) ................. 2008-133349

(51) Int. Cl.
*F02D 13/06* (2006.01)
*F02B 25/06* (2006.01)
(52) U.S. Cl. .................... 123/198 F; 123/572
(58) Field of Classification Search ............... 123/198 F, 123/572–574
See application file for complete search history.

(56) References Cited

U.S. PATENT DOCUMENTS

| | | | |
|---|---|---|---|
| 4,103,655 A | | 8/1978 | Coles |
| 4,366,788 A | * | 1/1983 | Tanaka et al. ............... 123/198 F |
| 4,494,494 A | | 1/1985 | Yahiro et al. |
| 4,528,969 A | | 7/1985 | Senga |
| 4,844,032 A | | 7/1989 | Groeger et al. |

FOREIGN PATENT DOCUMENTS

| | | |
|---|---|---|
| GB | 1510459 A | 5/1978 |
| JP | 2007-263022 A | 10/2007 |

OTHER PUBLICATIONS

European Office Action dated Oct. 25, 2010, issued in corresponding European Patent Application No. 09251362.1.
European Search Report dated Aug. 27, 2009, issued in corresponding European Patent Application No. E09251362.
European Office Action dated Apr. 8, 2010, issued in corresponding European Patent Application No. 09251362.1.

* cited by examiner

*Primary Examiner* — Noah Kamen
(74) *Attorney, Agent, or Firm* — Westerman, Hattori, Daniels & Adrian, LLP

(57) ABSTRACT

In a blowby gas treatment system for a multiple cylinder engine, in which: a first cylinder and a second cylinder are provided to the engine; a first fuel supply device that always operates during operation of the engine is connected to the first cylinder; and a second fuel supply device that is capable of stopping an operation thereof during the operation of the engine is connected to the second cylinder, first and second branch pipes of an intake manifold are connected to the first and second cylinders, and a blowby gas outlet of a breather chamber and a blowby gas inlet opening into the first branch pipe communicate with each other via a breather pipe, the breather chamber collecting a blowby gas of the engine. Accordingly, when any of the cylinders is stopped, it is possible to easily prevent a blowby gas from flowing toward the stopped cylinder.

2 Claims, 2 Drawing Sheets

BLOWBY GAS TREATMENT SYSTEM FOR MULTIPLE CYLINDER ENGINE

BACKGROUND OF THE INVENTION

1. Field of the Invention

The present invention relates to an improvement of a blowby gas treatment system for a multiple cylinder engine, in which: a first cylinder and a second cylinder are provided to the engine; a first fuel supply device that always operates during operation of the engine is connected to the first cylinder; and a second fuel supply device that is capable of stopping an operation thereof during the operation of the engine is connected to the second cylinder.

2. Description of the Related Art

Conventionally, in a general blowby gas treatment system for a multiple cylinder engine, an upstream end of a breather pipe is connected to a breather chamber in which a blowby gas is collected, and a downstream end of the breather pipe opens into a clean room in an air cleaner of an intake system of the engine, the blowby gas is recirculated to the intake system and burned together with an air-fuel mixture in a cylinder (see Japanese Patent Application Laid-open No. 2007-263022).

However, if such a conventional blowby gas treatment system is employed as it is in an engine including a cylinder whose operation may stop during operation of the engine, when any of the cylinders is stopped, a part of the blowby gas recirculated to the intake system flows toward the stopped cylinder and is discharged to the atmosphere without being burned.

SUMMARY OF THE INVENTION

The present invention is achieved in view of these circumstances, and has an object to provide a blowby gas treatment system for a multiple cylinder engine that can easily prevent a blowby gas from flowing toward a stopped cylinder when any of the cylinders is stopped.

In order to achieve the object, according to a feature of the present invention, in a multiple cylinder engine in which: a first cylinder and a second cylinder are provided to the engine; a first fuel supply device that always operates during operation of the engine is connected to the first cylinder; and a second fuel supply device that is capable of stopping an operation thereof during the operation of the engine is connected to the second cylinder, there is provided a blowby gas treatment system for the multiple cylinder engine in which, first and second branch pipes of an intake manifold are connected to the first and second cylinders, and a blowby gas outlet of a breather chamber and a blowby gas inlet opening into the first branch pipe communicate with each other via a breather pipe, the breather chamber collecting a blowby gas of the engine.

According to the above described feature of the present invention, when the blowby gas collected in the breather chamber is discharged through the breather pipe to the blowby gas inlet in the first branch pipe of the intake manifold during the operation of the engine, the first cylinder connecting to the first branch pipe always receives supply of fuel from the fuel supply device in a first throttle body and operates, and all the blowby gas is supplied to the first cylinder together with intake air passing through the first throttle body and burned. Thus, even when operation of the fuel supply device in a second throttle body is stopped to stop fuel supply injection therefrom and stop the operation of the second cylinder, only air is supplied to the second cylinder through an intake passage in the second throttle body. At this time, the blowby gas is not mixed into the air, thereby preventing an unburned blowby gas from being discharged from the engine. Further, this is achieved by an extremely simple structure in which the blowby gas inlet is formed to open into the second branch pipe, thereby preventing an increase in cost.

The above-described fuel supply device corresponds to first and second throttle bodies 12 and 13, respectively, described below.

The above description, other objects, characteristics and advantages of the present invention will be clear from detailed descriptions which will be provided for the preferred embodiment referring to the attached drawings.

DESCRIPTION OF THE PREFERRED EMBODIMENT

An embodiment of the present invention will be described below with reference to FIGS. 1 and 2.

Figure 1:
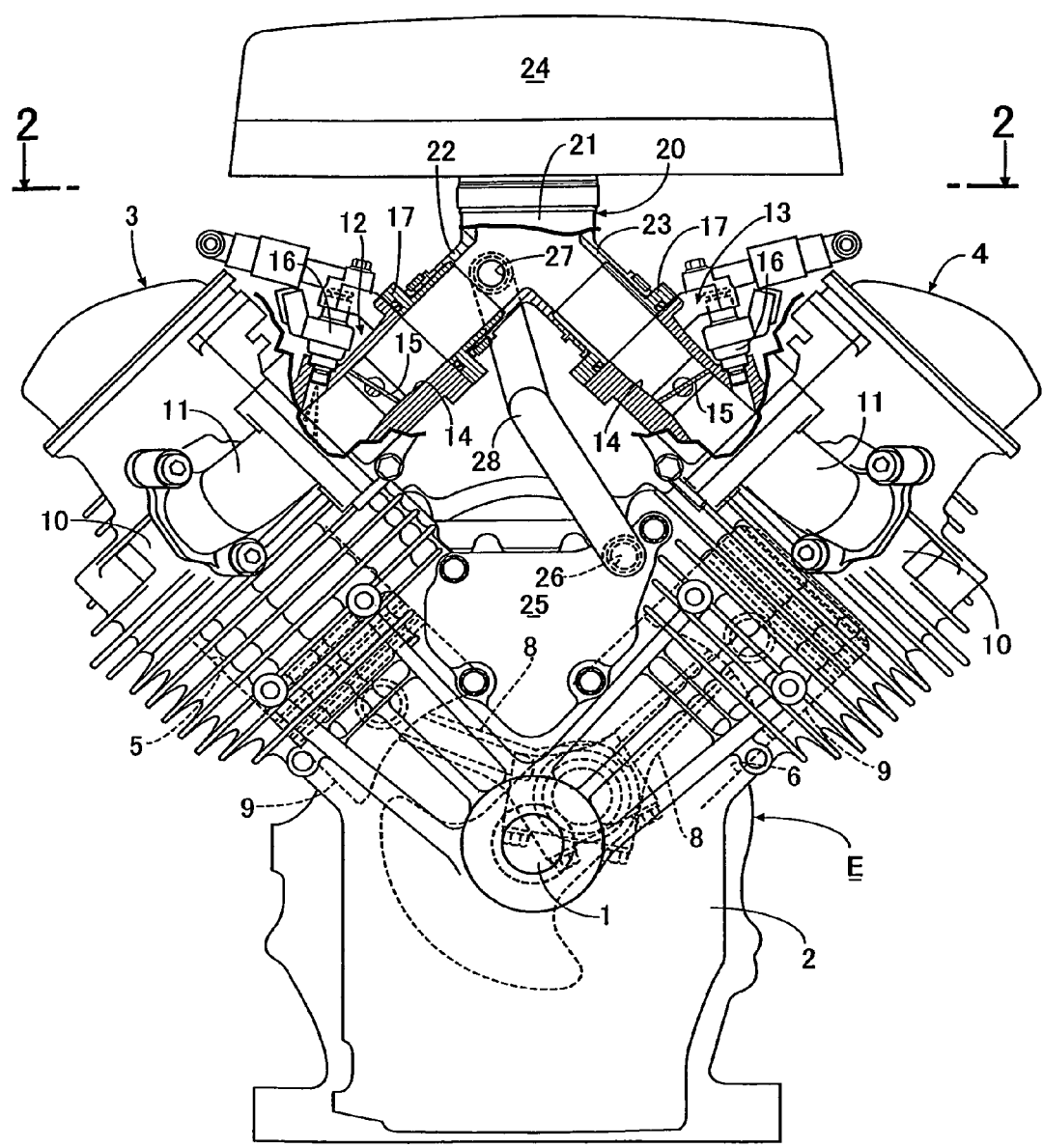
FIG. 1 is a front view of a multicylinder engine according to an embodiment of the present invention with an essential part cut out.
Figure 2:
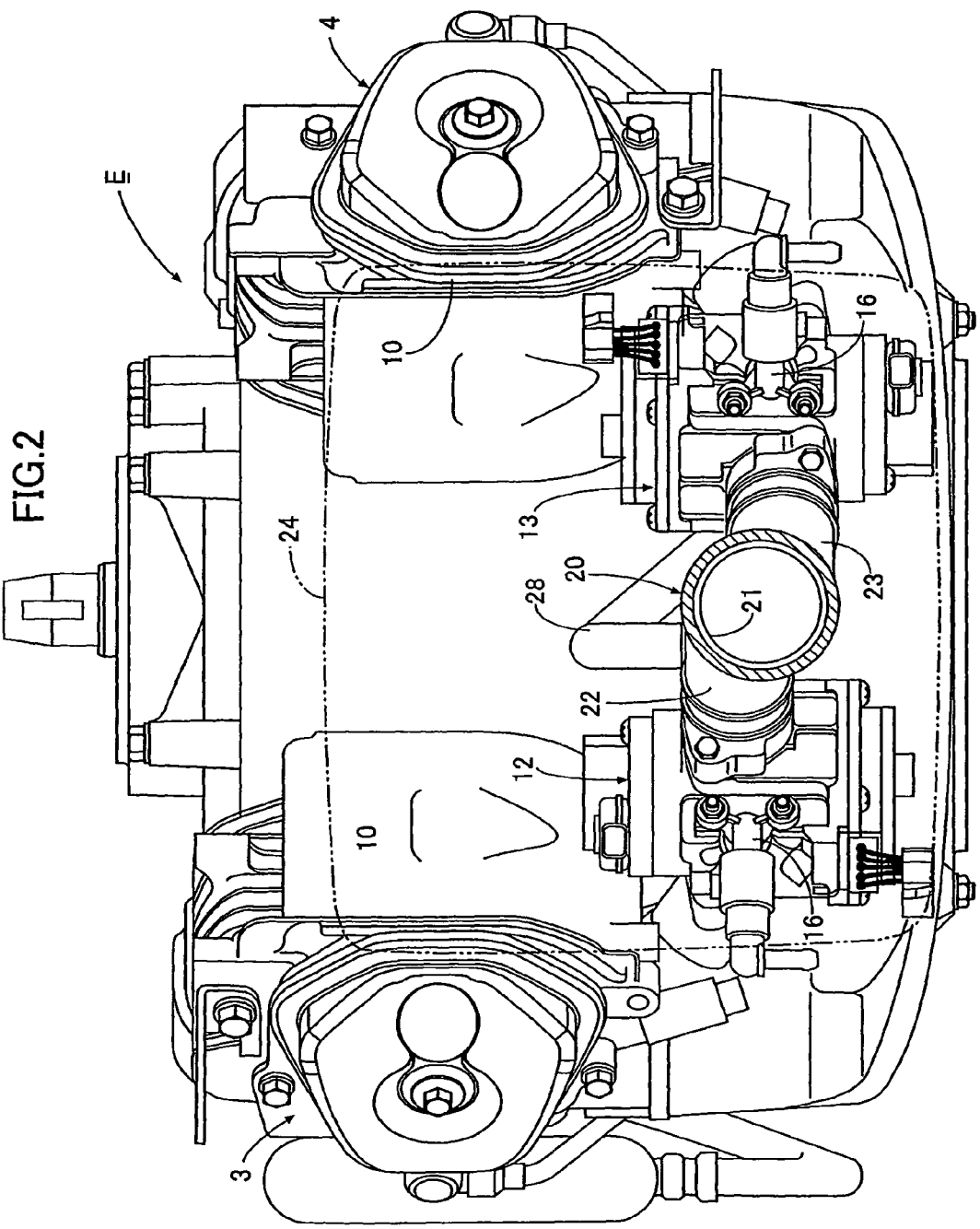
FIG. 2 is a cross-sectional view taken along a line 2-2 in FIG. 1.

In FIGS. 1 and 2, an example application of the present invention to a general-purpose V-type four-cycle two-cylinder engine E will be described. The engine E includes a crankcase 2 for supporting a crankshaft 1, and first and second banks 3 and 4 connected to an upper portion of the crankcase 2 and arranged in a V-shape with the crankshaft 1 at the center. The first and second banks 3 and 4 include first and second cylinders 5 and 6, respectively, and pistons 9 connected to the crankshaft 1 via connecting rods 8 are fitted to the first and the second cylinders 5 and 6. First and second throttle bodies 12 and 13 are mounted to the fronts of cylinder heads 10 of the first and second banks 3 and 4 via elbow-type intake pipes 11 and 11. The first and second throttle bodies 12 and 13 include throttle valves 15 for opening and closing intake passages 14 connecting to intake ports of the first and second cylinders 5 and 6, and electromagnetic fuel injection valves 16 for injecting fuel to the intake passages 14 downstream of the throttle valves 15. Connecting pipes 17 connecting to the intake passages 14 are coupled to upstream ends of the throttle bodies 12 and 23, and an intake manifold 20 is connected to the first and second throttle bodies 12 and 13 via the connecting pipes 17.

The intake manifold 20 comprises a main pipe 21 and a pair of first and second branch pipes 22 and 23 branching from the main pipe 21 in a V shape. The first and second branch pipes 22 and 23 are fitted and connected to the connecting pipes 17 of the first and second throttle bodies 12 and 13, and an air cleaner 24 is mounted to the main pipe 21. Thus, during an operation of the engine E, air filtered by the air cleaner 24 flows into the main pipe 21, then is divided into two streams and flows into the first and second branch pipes 22 and 23, moves to the intake passages 14 in the first and second throttle bodies 12 and 13, and is sucked into the first and second cylinders 5 and 6 while being mixed with fuel injected from the respective fuel injection valves 16.

The fuel injection valve 16 in the first throttle body 12 always operates and injects fuel toward the first cylinder 5 during the operation of the engine E, while the fuel injection valve 16 in the second throttle body 13 is controlled by an unshown electronic control unit so as to stop its operation to stop the second cylinder 6 according to an operation condition of the engine E (for example, during low speed operation when low fuel consumption is important).

A breather chamber 25 in which a blowby gas generated in the crankcase 2 is collected is formed in the engine E, and arranged between the first and second cylinders 5 and 6. A labyrinth is formed in the breather chamber 25 as is conventional, and oil is separated from the blowby gas while the blowby gas is passing through the labyrinth. A blowby gas outlet 26 is provided in an upper portion of the breather chamber 25. A blowby gas inlet 27 is provided to the first branch pipe 22 of the intake manifold 20, the blowby gas inlet 27 being opened into the inside of the first branch pipe 22. The blowby gas outlet and inlet 26 and 27 connect with each other via a breather pipe 28. It is to be noted that the blowby gas inlet 27 is provided in the first branch pipe 22 on a side of the first cylinder 5 whose operation does not stop.

When the blowby gas from which the oil is separated in the breather chamber 25 is discharged through the breather pipe 28 to the blowby gas inlet 27 in the first branch pipe 22 of the intake manifold 20 during the operation of the engine E, the first cylinder 5 connecting to the first branch pipe 22 always receives supply of the fuel injected from the fuel injection valve 16 in the first throttle body 12 and operates, and thus all the blowby gas is supplied to the first cylinder 5 together with intake air passing through the first throttle body 12 and burned.

Thus, when the operation of the fuel injection valve 16 in the second throttle body 13 is stopped to stop fuel injection therefrom and stop the operation of the second cylinder 6, only air is supplied to the second cylinder 6 through the intake passage 14 in the second throttle body 13. At this time, the blowby gas is not mixed into the air, thereby allowing an unburned blowby gas to be prevented from being discharged from the engine E. Further, this is achieved by an extremely simple structure in which the blowby gas inlet 27 is formed to open into the second branch pipe 23, thereby preventing an increase in cost.

The present invention is not limited to the above-mentioned embodiment and may be modified in a variety of ways as long as the modifications do not depart from its gist. For example, the present invention may be applied to a serial multiple cylinder engine. A plurality of first and second cylinders 5 and 6 may be provided in the engine E.

The invention claimed is:

1. A multiple cylinder engine comprising:
a first cylinder and a second cylinder;
a first fuel supply device that is arranged to always operate during operation of the engine connected to the first cylinder;
a second fuel supply device that is capable of stopping an operation of the second cylinder during the operation of the engine connected to the second cylinder; and
a blowby gas treatment system comprising:
first and second branch pipes of an intake manifold connected to the first and second cylinders respectively; and
a breather pipe arranged to supply a blowby gas of the engine to a blowby gas inlet opening onto the first branch pipe, the blowby gas inlet being provided on one side of the first branch pipe facing a first end in an axial direction of a crankshaft,
a breather chamber with a blowby gas outlet arranged to communicate with a blowby gas inlet via the breather pipe, the blowby gas outlet being provided on one side of the breather chamber facing a second end opposite to the first end in the axial direction of the crankshaft,
wherein the breather chamber is arranged to collect a blowby gas of the engine and a labyrinth is formed in the breather chamber to separate oil from the blowby gas;
the engine is V-shaped and the breather chamber is arranged between the first and second cylinders;
the branch pipes are arranged in an inverted V-shape.

2. An engine as recited in claim 1, wherein the first and second branch pipes are arranged in a space between the first and second cylinders above the breather chamber.

* * * * *